United States Patent [19]

Fielding

[11] Patent Number: 4,595,128

[45] Date of Patent: Jun. 17, 1986

[54] APPARATUS FOR DISPENSING AND DISTRIBUTING MOIST, SELF-ADHERING AND COMPACTIBLE MATERIALS

[75] Inventor: Randy L. Fielding, Fremont, Ohio

[73] Assignee: Christy Machine Company, Fremont, Ohio

[21] Appl. No.: 717,306

[22] Filed: Mar. 28, 1985

[51] Int. Cl.⁴ .................... B65D 88/54; G01F 13/00
[52] U.S. Cl. ................................. 222/252; 222/342; 222/352; 222/240; 222/333
[58] Field of Search ............... 222/333, 226, 238, 240, 222/411, 414, 281, 280, 252, 271, 312, 352, DIG. 1, 342, 403, 368; 118/644, 651, 652, 656

[56] References Cited

U.S. PATENT DOCUMENTS

| | | | |
|---|---|---|---|
| 351,483 | 10/1886 | Baldwin | 222/414 X |
| 1,680,487 | 8/1928 | Taylor | 222/281 X |
| 2,080,694 | 5/1937 | Calkins | 222/226 X |
| 2,321,082 | 6/1943 | Harshberger | 222/414 X |
| 3,070,264 | 12/1962 | Christy | 222/227 |
| 3,613,953 | 10/1971 | Paules | 222/271 X |
| 3,622,054 | 11/1971 | Davidson | 222/238 X |
| 3,788,529 | 1/1974 | Christy | 222/314 |
| 3,836,054 | 9/1974 | Schon | 222/414 |
| 4,350,269 | 9/1982 | Hanada et al. | 222/DIG. 1 X |
| 4,498,635 | 2/1985 | Fielding | 241/94 |
| 4,513,893 | 4/1985 | Baba | 222/281 |

FOREIGN PATENT DOCUMENTS

| | | | |
|---|---|---|---|
| 1184976 | 1/1965 | Fed. Rep. of Germany | 222/352 |
| 2921116 | 6/1979 | Fed. Rep. of Germany | 222/414 |
| 0101167 | 1/1980 | Japan | 118/652 |

Primary Examiner—Joseph J. Rolla
Assistant Examiner—P. McCoy Smith
Attorney, Agent, or Firm—Renner, Otto, Boisselle & Lyon

[57] ABSTRACT

Material dispenser apparatus includes a dispenser roll and dispenser roll cleaning brush mounted within the bottom discharge opening of a material receiving hopper for direct contact by the material in the hopper. The brush, being directly disposed to the material in the hopper, aids in displacing the material in the hopper toward the dispenser roll and compacting the dispenser roll with such material. Also, the brush clears the material from the dispenser roll as the brush and dispenser roll come into contact with each other. The speeds of rotation of the brush and dispenser roll are desirably each controlled independently of the other to permit them to be simultaneously rotated in the same direction but at different rpm for controlling the rate and size of material being dispensed. A material agitator may be provided in the material receiving hopper for working the material down within the hopper into contact with the surfaces of the dispenser roll and brush which are exposed to the material in the hopper. The material agitator includes a plurality of circumferentially spaced longitudinally extending agitator bars each of different lengths and supported at different radial distances from a rotating support shaft which may be driven by the same motor that drives the dispenser roll, but at a slower rpm.

39 Claims, 8 Drawing Figures

4,595,128

APPARATUS FOR DISPENSING AND DISTRIBUTING MOIST, SELF-ADHERING AND COMPACTIBLE MATERIALS

BACKGROUND OF THE INVENTION

This invention relates generally as indicated to a dispensing apparatus for dispensing and distributing moist, self-adhering and compactible materials, and more particularly, to a dispensing apparatus which provides for more controlled dispensing and more uniform distribution and depositing of such materials in controlled small amounts in a uniform, thin layer onto products or articles passing therebeneath.

Heretofore, machines have been used for dispensing various forms of substantially dry, flowable materials as by sprinkling or dispersion. Such machines are particularly useful in the processed food preparation industry for dispensing salt, sugar, seeds, garnishing, decorative coatings, etc., onto food products passing or conveyed beneath the dispensing machine. Examples of such machines are disclosed in U.S. Pat. Nos. 3,070,264 and 3,788,529.

In both of these patents, which are owned by the same assignee as the present application, the material is fed from a hopper onto a rotating dispensing roll which has been found to be very effective in dispensing various forms of flowable dry, or substantially dry, edible or non-edible materials onto edible or non-edible products in a controlled manner. However, such machines cannot be effectively utilized to reliably dispense relatively moist, self-adhering and compactible materials. These types of materials tend to clog up the hoppers of such machines despite the use of reciprocating agitating plates and an oscillating comb-like member in the hopper as shown in the '264 patent. Also, the dispensing rolls themselves tend to form a hollowed out area in such moist, self-adhering and compactible materials at the bottom of the hopper which prevents the materials from being picked up by the dispensing rolls.

The machine of the '264 patent also includes a pair of relatively opposed stripping brushes in sweeping engagement with oppostie sides of the dispensing roll below the hopper which are effective in sweeping or stripping material from the roll. Moreover, one form of machine disclosed in the '529 patent includes a rotatable brush which is driven off the dispenser roll and engages the periphery of the dispenser roll below the hopper to maintain the periphery of the dispenser roll clear of the material being dispensed or encrustations thereof. However, in neither case do such brushes aid in any way in displacing the material in the hopper toward the dispenser roll. Nor do such brushes in any way assist in compacting the dispenser roll with material from the hopper.

U.S. Pat. No. 4,498,635, also assigned to the same assignee as the present application, discloses a machine for use in dispensing a wide variety of dry and moist materials including those which are self-adhering and/or compactible or which tend to agglomerate. However, because of the manner in which the material is separated by the grid plates of such machine as such grid plates are reciprocated back and forth, it is not possible to dispense material using this type of machine in the precisely controlled small amounts required for some applications.

SUMMARY OF THE INVENTION

With the foregoing in mind, it is a principal object of this invention to provide a dispenser apparatus for dispensing and distributing moist, self-adhering and compactible materials at a relativey controlled rate in a thin, uniform layer on articles or products passing therebeneath.

In accordance with one aspect of the invention, both a dispenser roll and dispenser roll cleaning brush are mounted within the bottom discharge opening of a material receiving hopper for direct contact by the material in the hopper. The brush, being directly exposed to the material in the hopper, aids in displacing the material in the hopper toward the dispenser roll and compacting the dispenser roll with such material.

Also in accordance with the invention, the same brush that is used to compact the dispenser roll with material is also used to clear the material from the dispenser roll at a controlled rate over the entire length of the dispenser roll for dispensing the material in a relatively thin smooth layer onto articles or products passing therebeneath.

Further in accordance with the invention, the brush itself, being exposed to the material in the hopper, becomes compacted with such material, whereby a portion of the material carried by the brush is also dispensed therefrom along with the material that is cleared from the dispenser roll by the brush as the brush and dispenser roll come into contact with each other.

Still further in accordance with the invention, the speed of rotation of the brush and dispenser roll are each controlled independently of the other to permit them to be simultaneously rotated in the same direction but at different rpm in accordance with the rate and size of material being dispensed. Similarly, the relative positions of the dispenser roll and brush may be controlled to vary the rate and size of material being dispensed.

Further in accordance with the invention, the ends of the brush extend into brush wells in the end walls of the material receiving hopper to ensure that the brush clears the compacted material from the dispenser roll over substantially the entire length of the dispenser roll.

Also in accordance with the invention, the brush well at the driven end of the brush may include a removable end cap to facilitate removal of the brush for cleaning and/or replacement.

In accordance with another aspect of the invention, the motor mount bracket for the brush motor may be axially movable to disengage the motor from the brush shaft and then rotatable to permit the motor to be swung out of the way to facilitate removal and replacement of the brush.

In accordance with still another aspect of the invention, a plate may be used to partially cover the brush in the material receiving hopper to prevent the brush from becoming overly compacted with material.

In accordance with another aspect of the invention, a material agitator may be provided in the material receiving hopper for working the material down within the hopper into contact with the exposed surfaces of the dispenser roll and brush which extend upwardly within the hopper discharge opening. The material agitator includes a plurality of circumferentially spaced longitudinally extending agitator bars each of different lengths and supported at different radial distances from a rotating support shaft, whereby as the support shaft rotates, the agitator bars pass through the material at different points, causing the material to turn and continually fall and cave in, thus keeping the material moving down within the hopper into contact with the dispenser roll and brushes.

Also in accordance with the invention, the agitator support shaft may be driven by the same motor that drives the dispenser roll, but at a slower rpm.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE PREFERRED EMBODIMENT

Figure 1:
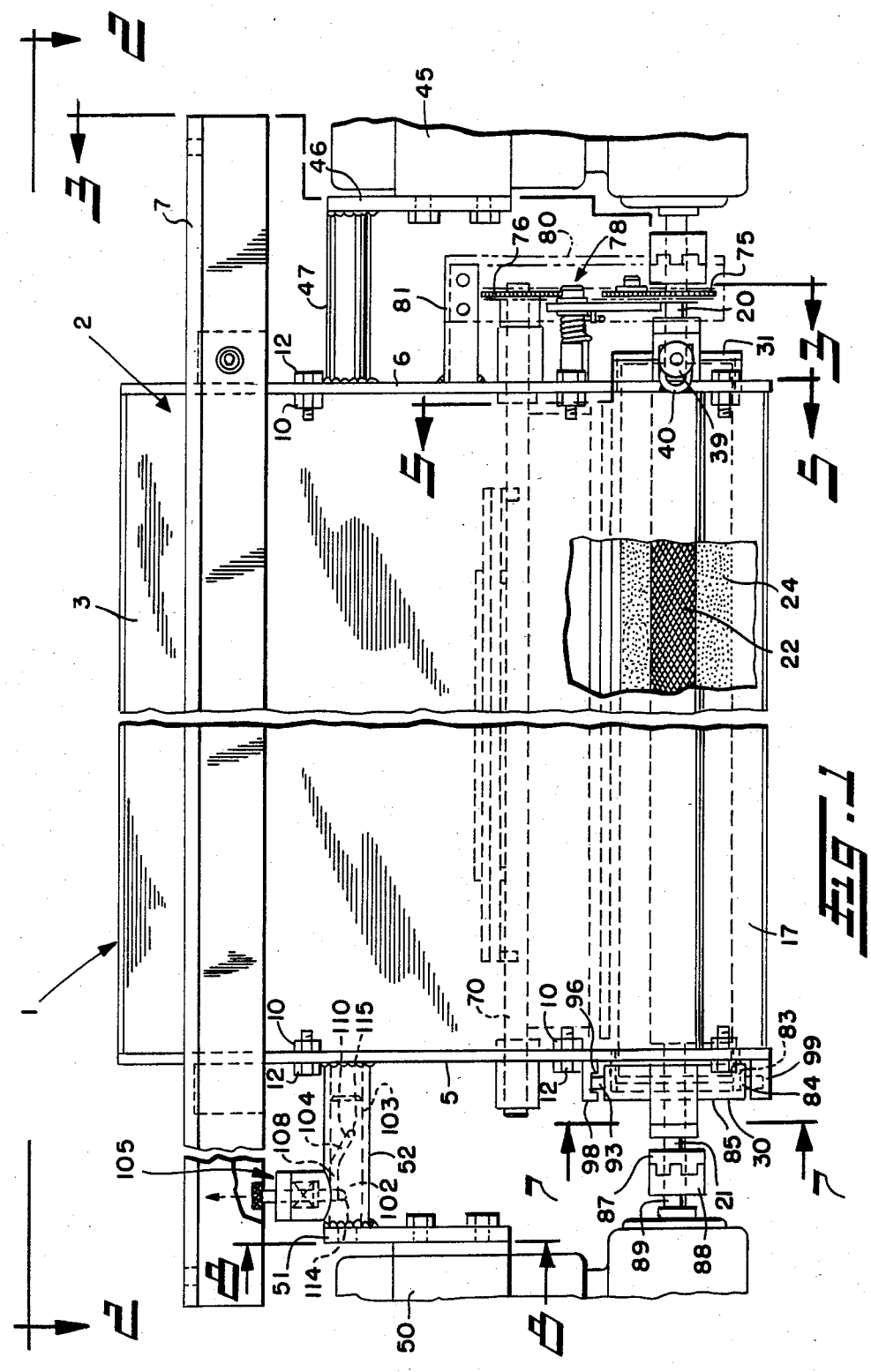
FIG. 1 is a fragmentary side elevation view of a preferred form of dispenser apparatus in accordance with this invention, partially broken away to show the dispenser roll and brush rotatably mounted within the bottom discharge opening of the material receiving hopper.
Figure 2:
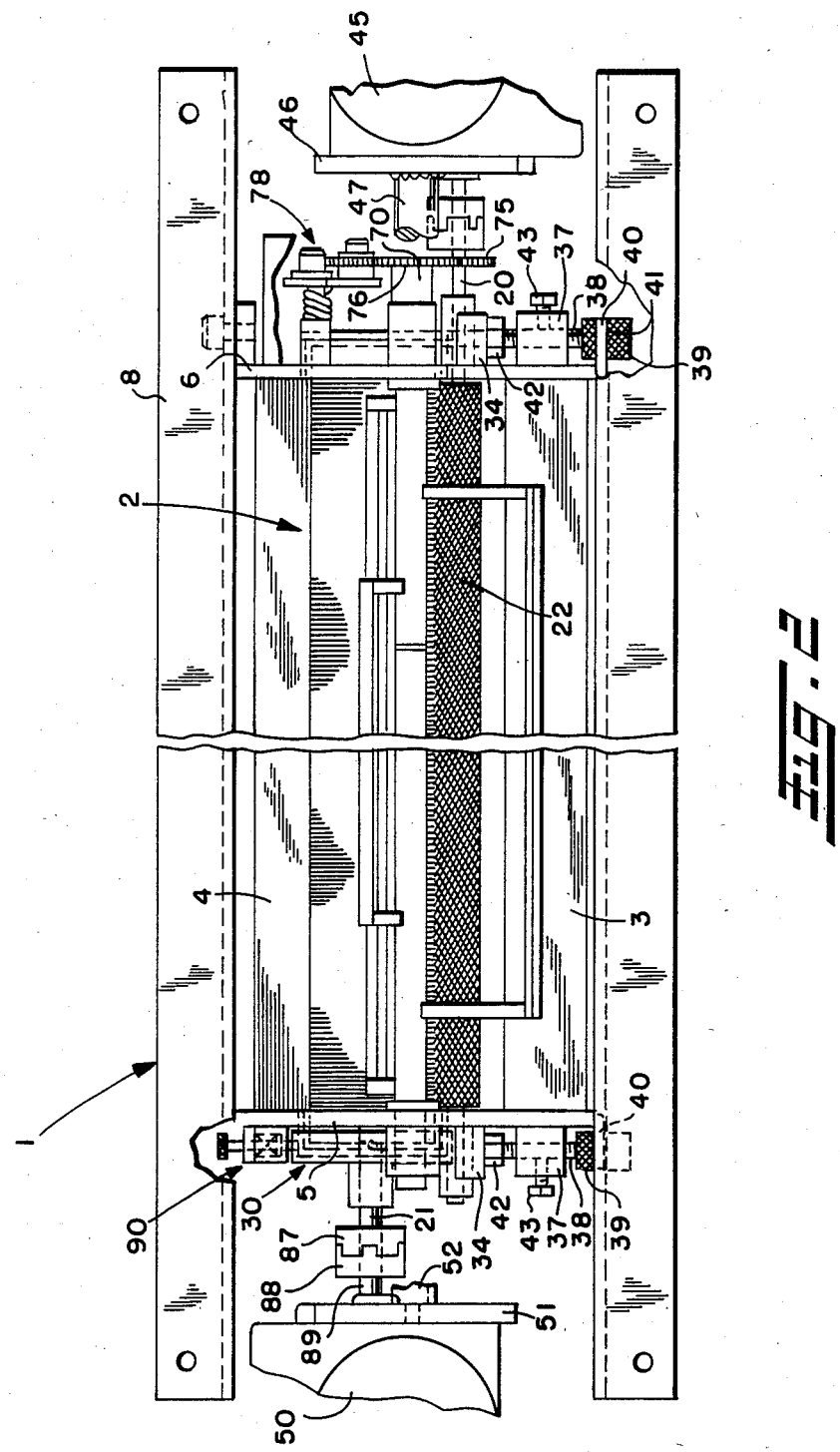
FIG. 2 is a fragmentary top plan view of the dispenser apparatus of FIG. 1 substantially as seen from the plane of line 2—2 thereof.

Referring now in detail to the drawings and initially to FIGS. 1 and 2, there is shown a preferred form of material dispenser apparatus 1 in accordance with this invention which is particularly suited for use in dispensing materials that are normally relatively difficult to dispense, especially in relatively controlled small amounts as a thin layer onto products or articles passing beneath the dispenser apparatus. Materials of this type are usually moist, self-adhering and compactible materials, which may either be edible or non-edible. Examples of edible materials which are normally difficult to dispense but which can readily be dispensed with the apparatus of the present invention are parmesan cheese, donut sugar, and toppings for crackers which include a vegetable oil or shortening making them self-adhering and compactible. Also, powders containing wax or other materials which make them self-adhering or compactible are normally difficult to dispense, but not with the dispensing apparatus of the present invention.

Figures 3, 4:
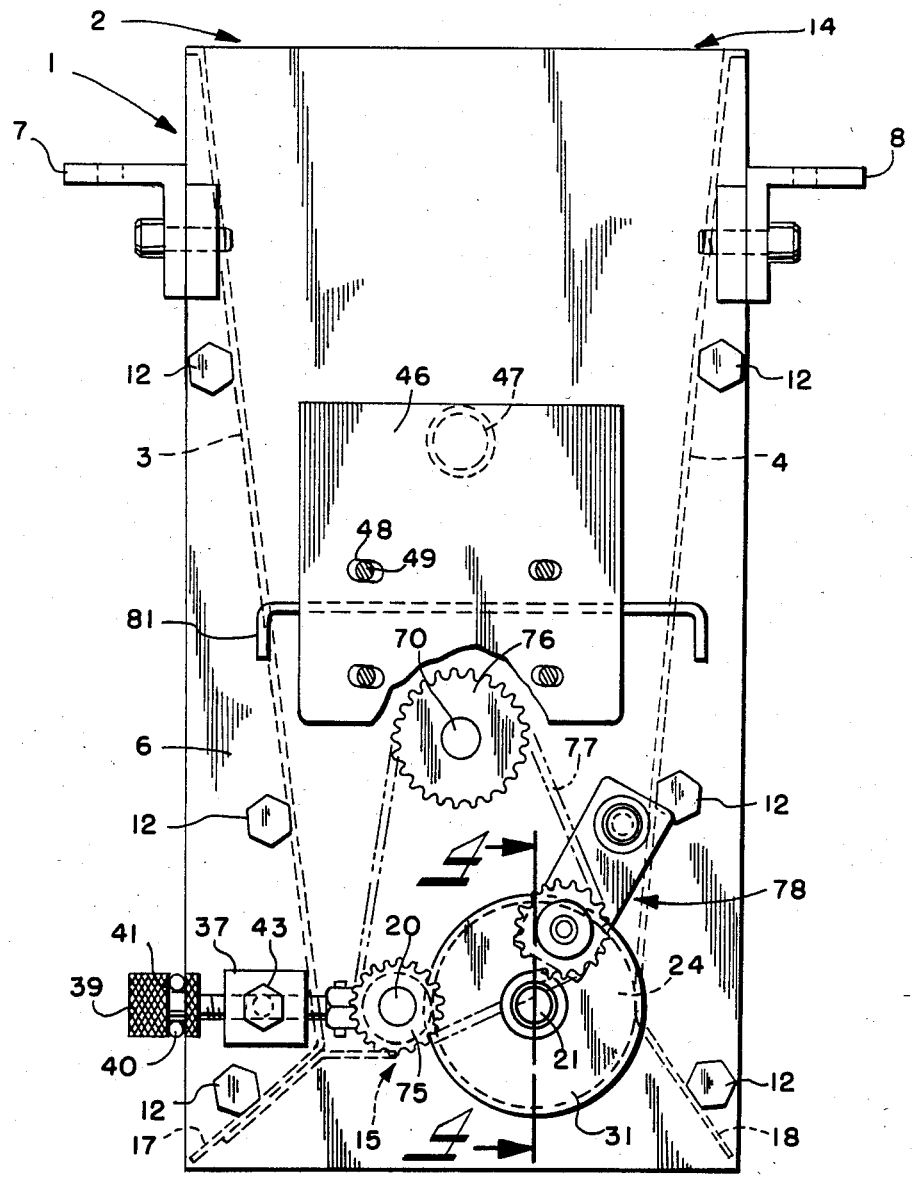
FIG. 3 is an enlarged fragmentary and elevation view of the dispenser apparatus of FIG. 1 as seen generally from the plane of the line 3—3 thereof which is located just inside the drive motor for the dispenser roll and material agitator.
FIG. 4 is a fragmentary longitudinal section through one of the end mounts for the dispenser brush, taken generally along the plane of line 4—4 of FIG. 3.

The dispensing apparatus 1 includes a hopper 2 for receiving the material to be dispensed. The hopper 2 is preferably formed by a pair of downwardly converging side walls 3, 4 closed at their ends by a pair of end plates 5, 6 bolted or otherwise secured to a pair of support rails 7, 8 extending exteriorly of the side walls and spaced slightly below the top edges thereof. To facilitate assembly of the side walls to the end plates, a plurality of spaced apart nuts 10 are desirably welded to the exterior surface of each side wall. Also, a plurality of suitably spaced holes are provided in each end plate which receive bolts 12 that are threaded into the nuts 10 on the exterior of the side walls as best seen in FIGS. 1 and 3. The hopper 2 has a relatively large area open top inlet 14 which may be closed by a cover (not shown) and a smaller area bottom discharge opening 15 adjacent the bottom for discharge of the material therefrom as described hereafter. Also, wind deflectors 17, 18 are desirably provided along the bottom edges of the hopper side walls 3, 4. As best seen in FIG. 3, such wind deflectors desirably slope downwardly and outwardly from the hopper discharge opening 15 to the bottom edges of the end plates 5, 6, which desirably extend approximately 1½ to 2 inches below the hopper discharge opening.

The dispenser apparatus may be supported on appropriate legs or posts (not shown) which may be bolted or otherwise secured to the ends of the support rails 7, 8 with the hopper 2 straddling a conveyor (also not shown) passing beneath the apparatus for dispensing the material onto the articles or products carried by the conveyor.

Mounted within the hopper 2 adjacent the bottom discharge opening 15 are a pair of laterally spaced longitudinally extending shafts 20, 21. The ends of the shafts are suitably mounted for rotation in the end plates 5, 6. Mounted on one of the shafts 20 for rotation therewith is a dispenser roll 22 which, as clearly shown in FIG. 2, extends substantially the full length of the hopper, terminating just short of the inside surfaces of the end plates. The other shaft 21 supports a brush 24 for rotation therewith.

Figure 5:
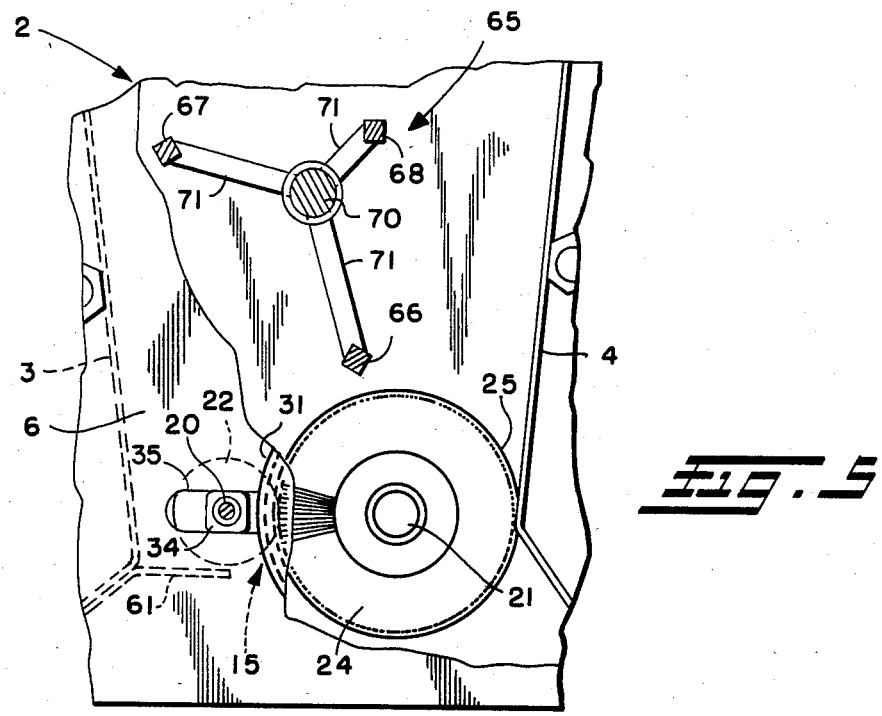
FIG. 5 is an enlarged fragmentary transverse section through the dispenser apparatus of FIG. 1 taken generally along the plane of line 5—5 thereof.
Figure 6:
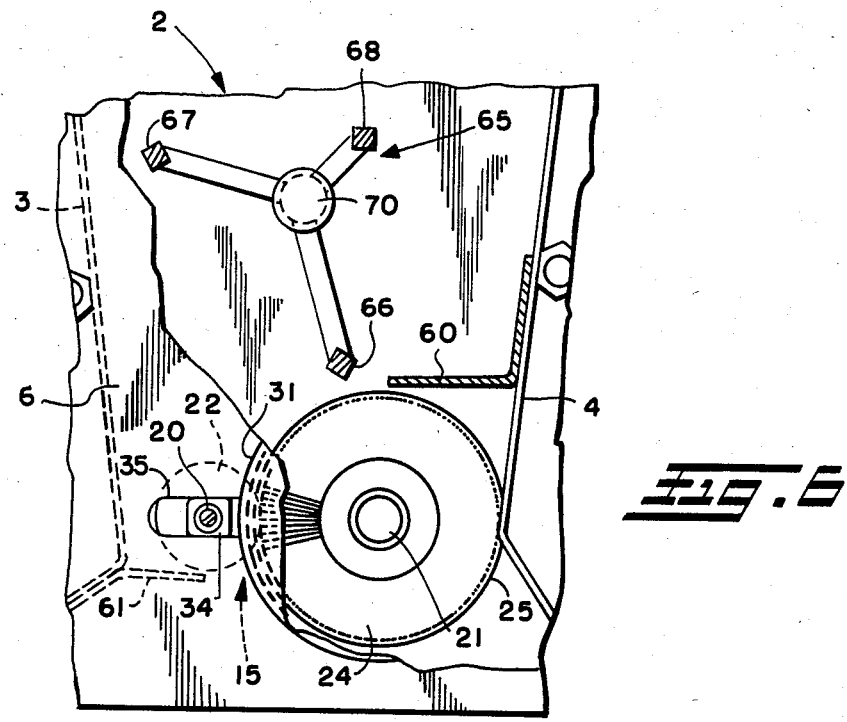
FIG. 6 is an enlarged fragmentary transverse section similar to FIG. 5 but showing a modified form of dispenser apparatus in accordance with this invention.

As best seen in FIGS. 5 and 6, the outer extremities of the brush bristles 25 on one side of the brush 24 are substantially tangent to one of the hopper side walls 4 in close sliding contact therewith as the brush rotates to prevent the material within the hopper from passing between the brush and such one side wall. The brush bristles on the opposite side of the brush are shown in engagement with the exterior surface of the dispenser roll 22. However, the position of the dispenser roll is preferably adjustable relative to the brush, from a maximum clearance of approximately ⅛ inch therebetween to a maximum overlap or interference of approximately 1/16 inch, which is accommodated for by the flexing of the brush bristles. Brush wells 30, 31 are also desirably provided in the end plates 5, 6 for receipt of the ends of the brush 24 (one such brush well 31 being shown in section in FIG. 3) to ensure that the brush bristles are in sliding contact with the hopper side wall 4 over the full length thereof and also uniformly spaced or contacting the dispenser roll over its entire length.

The exterior surface of the dispenser roll 22 is knurled or otherwise deformed to provide a multitude of uniformly spaced pockets or recesses therein for receipt of the material from the hopper. The fewer and deeper the knurls or pockets in the dispenser roll, the coarser the material being dispensed will be. Conversely, the more and shallower the knurls, the finer the material being dispensed will be. For dispensing extra coarse material, a diamond knurled roll having approximately thirteen knurls per linear inch may be used. For dispensing coarse material, a dispenser roll having sixteen such knurls per linear inch may be used; for dispensing standard medium material, a dispenser roll having eighteen knurls per linear inch may be used; for dispensing fine material, a dispenser roll having twenty-one knurls per linear inch may be used; and for dispensing extra fine material, a dispenser roll having twenty-five knurls per linear inch may be used, and so on.

Likewise, brushes 24 having different stiffnesses and densities of brush bristles 25 may be used depending on such factors as the type of material being dispensed, the number and depth of knurling in the dispenser roll, the amount of contact (or clearance) between the dispenser roll and brush surfaces, the rate and pattern of material to be dispensed, etc.

Controlled adjustment of the dispenser roll 22 laterally toward and away from the brush 24 may be accomplished as by mounting the ends of the dispenser roll shaft 20 in bushing slides 34 supported in transverse slots 35 in the end plates 5, 6 (see FIGS. 5 and 6). Engagement of the bushing slides 34 with the exterior of the brush end wells 30, 31 will limit the maximum extent to which the dispenser roll can be moved toward the brush. Engagement of the bushing slides 34 with the outer ends of the slots 35 will limit the outward movement of the bushing slides away from the brush.

Precise movement of the slides 34 along the slots 35 may be obtained by providing an adjustment screw 38 at each end of the hopper (see FIGS. 2 and 3). Each adjustment screw may have a knurled head portion 39 to facilitate turning by hand, and may be held against axial movement by a generally U-shaped band 40 attached to one edge of each end plate and extending into the opposite sides of an annular groove 41 in the head portion 39. Each adjustment screw extends through a hole in the respective blocks 37 which support the adjustment screws. The inner end of each adjustment screw threadedly engages a nut 42 attached to the outer end of each slide, whereby rotation of the adjustment screws 38 in opposite directions causes the desired lateral movement of the dispenser roll. The dispenser roll may be locked in the desired adjusted position by tightening a set screw 43 in each block into engagement with a flat (not shown) on the associated adjustment screw.

Rotation of the dispenser roll 22 may be effected by means of an electric motor 45 suitably coupled to the dispenser roll shaft 20. The electric motor 45 may be mounted on a bracket 46 attached to the end plate 6 by means of post 47 extending therebetween. The bracket 46 may have a plurality of slots 48 therein (see FIG. 3) for the motor mounting bolts 49 which when loosened permit the motor to be laterally adjusted to the same extent as the dispenser roll shaft for maintaining the motor output shaft in alignment with the dispenser roll shaft. A suitable motor controller (not shown) may be provided to control the motor 45 operation and to allow for variations in the rpm of the dispenser roll 22.

A second electric motor 50 is also desirably provided for driving the brush 24 independently of the dispenser roll 22. The motor 50 may be mounted on a bracket 51 attached to the other end plate 5 as by means of a post 52 extending therebetween, and may be coupled directly to the adjacent end of the brush shaft 21 which extends through the associated brush well 30 as shown in FIGS. 1 and 2. Also, a separate motor controller (not shown) may be provided to allow for variations in the speed of rotation of the brush independently of the dispenser roll.

The brush 24 is driven in a direction causing the brush to rotate toward the dispenser roll 22 as the brush passes through the material within the hopper (i.e., in a counterclockwise direction as viewed in FIGS. 5 and 6) to aid in displacing the material within the hopper toward the dispenser roll and compacting or clogging the dispenser roll with such material. The dispenser roll is driven in the same direction as the brush (i.e., in a counterclockwise direction as viewed in FIGS. 5 and 6) so that the exterior of the dispenser roll moves away from the brush as the dispenser roll passes through the material in the hopper to provide maximum exposure of the dispenser roll surface to the material being pushed thereagainst by the brush rotation and maximize the compaction of the material onto the dispenser roll surface before the material is dispensed therefrom.

As the dispenser roll rotates, the material remains compacted on the dispenser roll until the compacted surface comes into contact with the brush, at which time the brush action clears or cleans the material from the roll. Because the brush extends the full length of the dispenser roll, the brush uniformly cleans the dispenser roll along its entire length thus providing a uniform pattern of the material being deposited onto the articles or products passing therebeneath. Also, rotating the brush and dispenser roll at different speeds will result in a different but uniform pattern of the material being deposited on the articles or products passing therebeneath, as will varying the distance between the dispenser roll and brush, the type of knurling on the roll, the type and stiffness of the brush bristles, etc. Likewise, if the brush is rotated faster than the dispenser roll, the brush will refine the material a little more because of the excess speed. Moreover, because the brush itself is exposed to the material in the hopper, the brush becomes compacted with material, and a portion of this compacted material is dispensed from the brush along with the material cleared from the dispenser roll by the brush as the brush and dispenser roll come together.

If the brush becomes overly compacted, the material might interfere with the operation of the brush in moving the material in the hopper into compacted engagement with the dispenser roll and clearing the dispenser roll of the compacted material. In the event that should become a problem, a plate 60 may be mounted in the hopper 2 to partially cover the top of the brush. As shown in FIG. 6, the plate 60 may be attached to the hopper side wall 4 contacted by the brush and should desirably not extend more than half way across the width of the brush so that at least one-fourth of the exterior surface of the brush still remains exposed to the material in the hopper. Of course, the plate 60 should extend the full length of the hopper, and should be slightly spaced from the upper surface of the brush as shown.

In one form of dispenser apparatus in accordance with this invention, the dispenser roll 22 has an outer diameter of approximately one inch, and the brush 24 has an outer diameter of approximately two and one-half inches. Also, the discharge opening 15 at the bottom of the hopper has a width of approximately four inches, leaving a space of approximately one-half inch between the dispenser roll 22 and the adjacent hopper side wall 3. The hopper has an overall length of approximately 37 inches. However, it will be appreciated that such apparatus may be constructed in different lengths to vary the output or discharge of the material therefrom. Also two or more of such apparatus may be arranged in endwise and/or staggered relation to increase the length and/or output of material discharged therefrom.

To prevent material passing between the dispenser roll 22 and adjacent hopper side wall 3 from being discharged from the hopper 2 through the bottom discharge opening 15, a lip 61 is provided adjacent the bottom edge of the hopper side wall 3. The lip 61 extends inwardly from the hopper side wall 3 beneath the dispenser roll to approximately the center of the dispenser roll as shown in FIGS. 5 and 6, with a slight clearance therebetween, for example, a clearance of approximately 1/16 inch.

To further assist in the downward movement of the material within the hopper 2 and into contact with the exposed surfaces of the dispenser roll and brush, a material agitator 65 may be mounted within the hopper above the dispenser roll and brush. As best seen in FIGS. 5 and 6, such material agitator desirably consists of a plurality of circumferentially spaced longitudinally extending agitator bars 66, 67, 68 supported at different radial distances from a rotating support shaft 70. In the preferred embodiment disclosed herein, three such agitator bars are provided, each supported at their ends by arms 71 extending radially outwardly from the exterior surface of the support shaft 70. The three agitator bars are uniformly spaced approximately 120° apart, and are desirably made from one-quarter inch square barstock oriented at a 45° angle so that one corner of each agitator bar initially penetrates the material as the agitator bars are rotated to facilitate separation and movement of the material within the hopper as the bars pass through the material.

Also, the bars 66, 67, 68 are supported at different radial distances from the support shaft and are of different lengths. The longest bar 66 desirably extends almost the full length of the hopper with adequate clearance between the ends thereof so as not to interfere with its rotation within the hopper. Also, the longest bar 66 is desirably spaced the furthest away from the support shaft 70. In one embodiment of the subject dispenser apparatus, the longest bar 66 is spaced approximately one and three-quarter inches from the exterior surface of the support shaft 70, and has a minimum clearance of approximately one-quarter inch from the exterior surfaces of the brush 24 and hopper side walls 3, 4. The next longest agitator bar 67 is approximately three-fourths the length of the hopper with equal spacing from the ends of the bar and the adjacent hopper end plates 5, 6. Also, the radial spacing of the second longest agitator bar 67 from the exterior surface of the support shaft 70 is somewhat less, for example, approximately one and three-eighths inches. The shortest agitator bar 68 has a length approximtely one-half the length of the hopper, with equal spacing between the ends of the bar and the adjacent hopper end plates. Also, the bar 68 is spaced still closer to the exterior surface of the support shaft 70, for example, approximately one inch therefrom.

With such an agitator construction, as the support shaft 70 rotates, the agitator bars 66, 67, 68 pass through the material at different points, causing the material to turn and continually fall and cave in. This keeps the material moving down within the hopper into contact with the exterior surfaces of the dispenser roll and brush.

The agitator support shaft 70 is preferably driven off the same motor 45 that drives the dispenser roll 22, but is geared to rotate slower than the dispenser roll, for example, a gear reduction of four to one. To drive the agitator shaft 70 off the dispenser roll shaft 20, suitably sized gears 75, 76 are mounted on the ends of the respective shafts 20, 70, with a chain 77 extending therebetween as shown in FIGS. 1 and 3. Also, a chain tensioner 78 may be provided as further shown in FIG. 3 to take up any slack in the chain which is necessary in order to be able to adjust the lateral position of the dispenser roll relative to the brush in the manner previously described. A removable cover 80, shown in phantom lines in FIG. 1, may be supported by a bracket 81 attached to the end plate 6 to cover the gear drive 75, 76 and chain tensioner 78.

When a brush cover plate 60 is provided in conjunction with a brush 24 as shown in FIG. 6, care must be taken to make certain that the plate 60 does not in any way interfere with the rotation of the material agitator 65.

Figure 7:
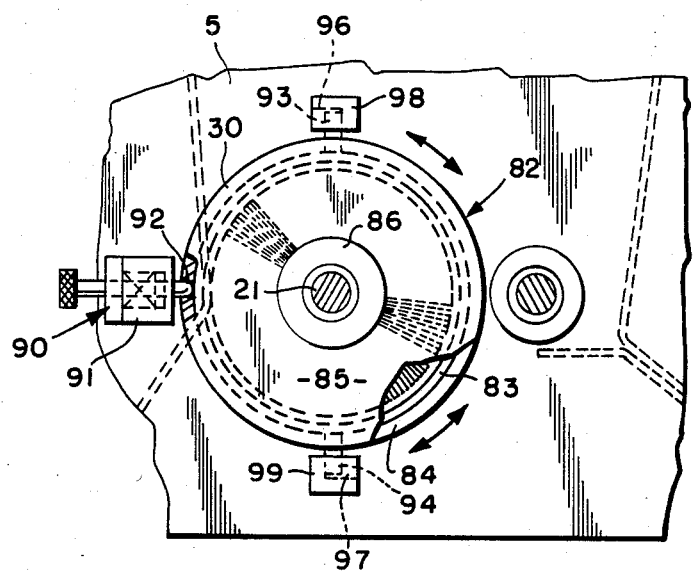
FIG. 7 is an enlarged partial and elevation view of the brush well at the driven end of the brush which includes a removable end cap to facilitate removal of the brush for cleaning and/or replacement.

To facilitate removal of the brush 24 for cleaning and/or replacement with another brush having a different type of bristle, etc., the brush well 30 at the driven end of the brush desirably includes a removable end cap 82 which is slidably received over an inner ring 83 welded to the outer surface of the end plate 5 (see FIGS. 1, 2 and 7). The end cap 82 includes an outer ring portion 84 having an inner diameter slightly greater than the outer diameter of the inner ring 83 and an end closure 85 at the axial outer end thereof. The end closure 85 has a central opening therethrough in which is mounted a sleeve bushing 86 through which the adjacent end of the brush shaft 21 extends. On the outer end of the brush shaft 21 is a coupling member 87 which axially engages another coupling member 88 on the motor drive shaft 89 to provide a driving connection therebetween. The end cap 82 may be releasably held in place on the inner ring 83 by providing a spring loaded pin 90 supported by a block 91 on the outer surface of the end plate 5 for radial movement into and out of engagement with a locking hole 92 in the exterior of the outer ring portion 84 of the end cap 82. Also a pair of non-rotation pins 93, 94 may be provided on opposite sides of the outer ring portion 84 for engagement in oppositely facing slots 96, 97 in additional blocks 98, 99 welded to the end plate 5 to prevent rotation of the end cap 82 in the direction in which the brush is normally turned by the brush motor 50, i.e., in a clockwise direction as viewed in FIG. 7.

Figure 8:
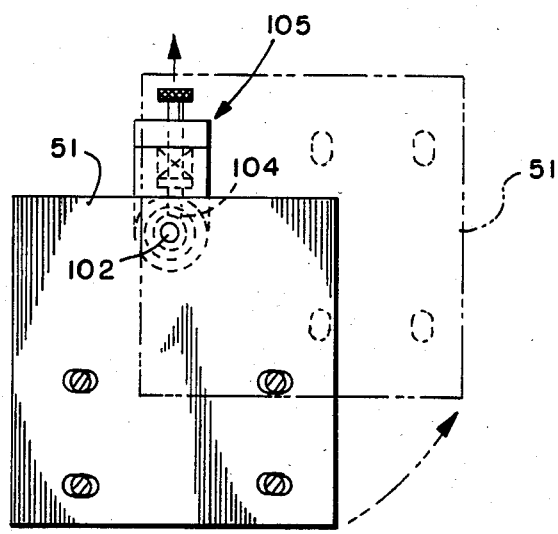
FIG. 8 is an enlarged end elevation view of the motor mount bracket for the brush motor which is initially axially movable to disengage the motor from the brush shaft and then rotatable to permit the motor to be swung out of the way during removal and replacement of the brush.

Of course, before the brush 24 can be removed, the brush must be disconnected from the drive motor 50 and the motor moved out of the way so as not to interfere with such removal. In the preferred embodiment disclosed herein, this is accomplished by providing a stud shaft 102 on the motor mounting bracket 51 which is received within a longitudinal bore 103 in the post 52 (see FIGS. 1 and 8). The stud shaft 102 has a cam slot 104 in the exterior surface thereof which is engaged by a spring loaded pin 105 suitably mounted on the exterior of the post 52 and extending radially inwardly through an opening in the wall of the post 52 into engagement with the cam slot for controlling the inward and outward movement of the motor mounting bracket toward and away from the brush. The cam slot 104 includes a straight axially extending portion 108 which is engaged by the spring loaded pin 105 during the initial outward movement of the motor mounting bracket 51 to cause the brush motor 50 to move axially in a straight line until the coupling member 88 on the motor drive shaft 89 is disconnected from the coupling member 87 on the brush shaft 21. Also, the cam slot 104 includes a spiral portion 110 which is engaged by the spring loaded pin 105 after the brush motor has been moved axially sufficiently to disengage the motor from the brush shaft to cause the brush motor to rotate approximately 90° to the phantom line position shown in FIG. 8 to swing the motor out of alignment with the brush where it will not interfere with the removal of the brush from the hopper 2.

At opposite ends of the cam slot 104 are holes 114, 115 which are respectivey engaged by the spring loaded pin 105 to lock the brush motor in either of the extreme positions until the spring loaded pin 105 is pulled out of the respective holes and the motor mounting bracket 51 is either pulled or pushed to cause the spring loaded pin 105 to ride along the cam slot 104 until it snaps back into one or the other of the holes once again to lock the motor mounting bracket and thus the motor in place.

After the brush motor has been moved axially outwardly and rotated out of the way and the brush has been removed and replaced, the spring loaded pin 105 may be disengaged from the inner hole 115 to permit the brush motor to be pushed inwardly. During such movement, first the cam slot 104 causes the brush motor to rotate back to bring the motor shaft into alignment with the brush shaft and then to move axially inwardly to cause the coupling member 88 on the motor shaft 89 once again to engage the coupling member 87 on the brush shaft 21. When the coupling members 88, 87 are fully engaged, the spring loaded pin 105 will snap back into the other hole 114 thus once again locking the brush motor 50 in the drive position.

The components of the apparatus and particularly those which contact the material being dispensed, namely, the hopper, material agitator, and dispenser roll, as well as the dispenser roll shaft and brush shaft, are desirably made of stainless steel or similar material which does not corrode, so that the apparatus may be easily kept in sanitary condition as by steam cleaning.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A dispenser apparatus comprising a material receiving hopper having a top inlet and a bottom discharge opening, a dispenser roll and dispenser roll cleaning brush mounted for rotation within said hopper adjacent said bottom discharge opening, said dispenser roll and brush being directly exposed to the material in said hopper and in closely spaced relation to each other, said dispenser roll having a knurl-like surface in which the material in said hopper is compacted, and means for rotating said brush in a direction causing said brush to rotate toward said dispenser roll as said brush passes through the material in said hopper to aid in displacing the material in said hopper towards said dispenser roll and compacting said dispenser roll with such materisl, and for rotating said dispenser roll in a direction causing the exterior of said dispenser roll to move away from said brush as said dispenser roll passes through the material in said hopper, said brush also being operative to clean said dispenser roll of the compacted material as said dispenser roll and brush come together during such rotation.

2. The dispenser apparatus of claim 1 wherein said means for rotating comprises separate motors for simultaneously rotating said dispenser roll and brush independently of each other.

3. The dispenser apparatus of claim 1 wherein said means for rotating includes means for controlling the speed of rotation of said dispener roll and brush independently of each other to permit said dispenser roll and brush to be rotated at different rpm in accordance with the rate and size of material being dispensed.

4. The dispenser apparatus of claim 1 wherein said brush includes bristles which are compacted with the material during rotation of said brush through said material in said hopper, a portion of said compacted material being dispensed from said brush as said brush and dispenser roll come together during such rotation.

5. The dispenser apparatus of claim 4 further comprising means for covering a portion of the upper surface of said brush for limiting the exposure of said brush bristles to the material in said hopper.

6. The dispenser apparatus of claim 5 wherein said means for limiting comprises a plate in said hopper which covers a portion of the upper surface of said brush which would otherwise be exposed to the material in said hopper.

7. The dispenser apparatus of claim 1 wherein said hopper includes a pair of downwardly converging side walls, said brush having bristle means substantially tangent to one of said side walls in close sliding contact therewith as said brush rotates upwardly within said bottom discharge opening for preventing material within said hopper from passing between said bristle means and said one side wall.

8. The dispenser apparatus of claim 7 further comprising a pair of end plates for closing the ends of said hopper side walls, said end plates having brush wells therein for receipt of the ends of said brush which extend beyond the ends of said hopper.

9. The dispenser apparatus of claim 7 further comprising a plate in said hopper covering a portion of the upper surface of said brush which would otherwise be exposed to the material in said hopper to prevent said brush from becoming overly compacted with material.

10. The dispenser apparatus of claim 9 wherein said plate is mounted to said one side wall and extends inwardly from said one side wall no more than half way across the width of said brush.

11. The dispenser apparatus of claim 9 wherein said plate is mounted to said one side wall and extends approximately half way across the width of said brush.

12. The dispenser appartus of claim 7 wherein there is a space between said dispenser roll and the other side wall of said hopper, further comprising a lip extending inwardly from said other side wall underlying said dispenser roll to prevent material passing between said dispenser roll and said other side wall from being discharged from said hopper through said bottom discharge opening.

13. The dispenser apparatus of claim 12 wherein said lip extends beneath said dispenser roll to approximately the center thereof.

14. The dispenser apparatus of claim 1 further comprising means for moving said dispenser roll laterally toward and away from said brush to vary the spacing therebetween.

15. The dispenser apparatus of claim 14 wherein said means for moving comprises screw means at opposite ends of said dispenser roll for moving said dispenser roll toward and away from said brush.

16. The dispenser apparatus of claim 1 further comprising material agitator means in said hopper for working the material down within said hopper into contact with the upper surfaces of said dispenser roll and brush which are exposed to the material in said hopper.

17. The dispenser apparatus of claim 16 wherein said material agitator means comprises a plurality of circumferentially spaced longitudinally extending agitator bars supported at different radial distances from a rotating support shaft within said hopper, whereby as said support shaft rotates, said agitator bars pass through the material in said hopper at different points, causing the material to cave in and fall within said hopper into contact with said dispenser roll and brush.

18. The dispenser apparatus of claim 17 wherein each of said agitator bars is of a different length.

19. The dispenser apparatus of claim 17 wherein the greater the radial distance of said agitator bar from said support shaft, the greater the length of said agitator bar.

20. The dispenser apparatus of claim 17 wherein each of said agitator bars is substantially square in section and is oriented at an angle of approximately 45° so that one corner of each of said agitator bars initially penetrates the material in said hopper as said agitator bars are rotated to facilitate separation and movement of the material as said agitator bars pass through the material.

21. The dispenser apparatus of claim 17 wherein there are three of said agitator bars spaced approximately 120° apart around said support shaft.

22. The dispenser apparatus of claim 21 wherein the agitator bar which is furthest from said support shaft extends approximately the full length of said hopper, the agitator bar the next furthest from said support shaft extends approximately three-quarters of the length of said hopper, and the agitator bar closest to said support shaft extends approximately one-half the length of said hopper.

23. The dispenser apparatus of claim 17 wherein said means for rotating said dispenser roll also rotates said support shaft for said agitator bars.

24. The dispenser apparatus of claim 23 wherein said means for rotating rotates said support shaft at a slower rate than said dispenser roll.

25. The dispenser apparatus of claim 1 wherein said hopper includes a pair of downwardly converging side walls, and a pair of end plates close the ends of said side walls, said side walls having nuts welded to the exterior of said side walls for receipt of bolts extending through holes in said end plates for securing said side walls between said end plates.

26. The dispenser apparatus of claim 25 further comprising a pair of support rails extending exteriorly of said side walls, said end plates being bolted to said support rails for suspending said hopper from said support rails.

27. The dispenser apparatus of claim 1 wherein said hopper includes a pair of downwardly converging side walls, and a pair of end plates at the ends of said side walls, said end plates extending downwardly below said bottom discharge opening, and wind deflectors along the bottom edges of said side walls, said wind deflectors sloping downwardly and outwardly from said bottom discharge opening to the bottom edges of said end plates.

28. The dispenser apparatus of claim 1 further comprising a pair of end plates for closing the ends of said hopper, said end plates having brush wells for receipt of the ends of said brush which extend beyond the ends of said hopper.

29. The dispenser apparatus of claim 28 wherein one of said brush wells includes a removable end cap to facilitate removal of said brush for cleaning and replacement.

30. The dispenser apparatus of claim 29 wherein said one brush well includes an inner ring mounted on the exterior of one of said end plates, said end cap being slidably received over said inner ring, and means for releasably connecting said end cap to said inner ring.

31. The dispenser apparatus of claim 30 wherein said means for releasably connecting comprises a spring loaded pin mounted on said one end plate for radial movement into and out of engagement with a locking hole in the exterior surface of said end cap.

32. The dispenser apparatus of claim 30 further comprising a shaft bushing on said end cap, said brush including a brush shaft supported for rotation by said shaft bushing.

33. The dispenser apparatus of claim 32 wherein said means for rotating comprises separate dispenser roll and brush motors for simultaneously rotating said dispenser roll and brush independently of each other, said brush motor including a drive shaft having first coupling means thereon, and said brush shaft extending beyond said shaft bushing and having second coupling means thereon engageable by said first coupling means on said drive shaft for driving said brush shaft by said brush motor.

34. The dispenser apparatus of claim 33 further comprising means for disengaging said coupling means and for rotating said brush motor out of alignment with said brush during removal of said brush.

35. The dispenser apparatus of claim 34 wherein said means for disengaging said coupling means and for rotating said brush motor out of alignment with said brush during removal of said brush comprises a motor mounting bracket for said brush motor, said bracket having a stud shaft thereon, a post extending outwardly from said one end plate, said post having a longitudinal bore for receipt of said stud shft, said stud shaft having a cam slot therein, and a spring loaded pin mounted on said post, said pin extending through an opening in said post into engagement with said cam slot, said cam slot having an axially extending portion for initially permitting axial movement of said brush motor away from said brush to disengage said coupling means and a spiral portion axially inwardly of said axially extending portion for subsequently rotating said brush motor out of alignment with said brush during continued outward movement of said brush motor away from said brush.

36. The dispenser apparatus of claim 35 further comprising pin engaging holes at the ends of said cam slot for engagement by said pin to releasably lock said motor in one of two end positins in which said motor is either drivingly connected to said brush or disengaged from said brush and rotated out of alignment with said brush.

37. The dispenser apparatus of claim 30 further including pin means extending radially outwardly from said end cap, and block means on said one end plate having slots therein for engagement by said pin means to prevent rotation of said end cap in the direction in which said brush is normally rotated by said brush motor.

38. A dispenser apparatus comprising a material receiving hopper having a top inlet and a bottom discharge opening, and a dispenser roll and dispenser roll cleaning brush mounted for rotation within said hopper adjacent said bottom discharge opening, said hopper including a pair of downwardly converging side walls, the exterior surface of said brush being substantially tangent to one of said side walls in close sliding contact therewith, means for rotating said brush in a direction causing said brush to rotate upwardly past said one side wall and through the material in said hopper to prevent the material within said hopper from passing between said brush and said one side wall, and means for rotating said dispenser roll in a direction causing the exterior of said dispenser roll to move away from said brush as said dispenser roll passes through the material in said hopper, said brush being operative to clean the material from said dispenser roll as said dispenser roll and brush come together during such rotation, said dispenser roll and the other side wall of said hopper having a space therebetween, and a lip extending inwardly from said other side wall underlying said dispenser roll to prevent material passing between said dispenser roll and said other side wall from being discharged from said hopper through said bottom discharge opening.

39. A dispenser apparatus comprising a material receiving hopper having a top inlet and a bottom discharge opening, and a dispenser roll and dispense roll cleaning brush mounted for rotation within said hopper adjacent said bottom discharge opening, said hopper including a pair of downwardly converging side walls, and means for rotating said brush in a direction causing said brush to rotate upwardly past said one side wall and through the material in said hopper, said brush including bristle means substantially tangent to one of said side walls in close sliding contact therewith for preventing the material within said hopper from passing between said brush and said one side wall during such rotation of said brush, and means for rotating said dispenser roll in a direction causing the exterior of said dispenser roll to move away from said brush as said dispenser roll passes through the material in said hopper, said bristle means being operative to clean the material from said dispenser roll as said dispenser roll and brush come together during such rotation.

* * * * *